United States Patent
Kamiguchi et al.

(10) Patent No.: US 11,265,185 B2
(45) Date of Patent: Mar. 1, 2022

(54) COMMUNICATION SYSTEM, RECEIVING DEVICE, TRANSMISSION INTERVAL CHANGE METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shogo Kamiguchi, Yokkaichi (JP); Masayuki Inoue, Yokkaichi (JP); Hiroshi Tateishi, Yokkaichi (JP); Shinichi Aiba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/041,120

(22) PCT Filed: Mar. 6, 2019

(86) PCT No.: PCT/JP2019/008726
§ 371 (c)(1),
(2) Date: Sep. 24, 2020

(87) PCT Pub. No.: WO2019/188055
PCT Pub. Date: Oct. 3, 2019

(65) Prior Publication Data
US 2021/0119824 A1    Apr. 22, 2021

(30) Foreign Application Priority Data
Mar. 27, 2018 (JP) .............................. JP2018-060876

(51) Int. Cl.
*H04L 12/40* (2006.01)
*H04L 29/08* (2006.01)
*H04L 67/12* (2022.01)

(52) U.S. Cl.
CPC .............. *H04L 12/40* (2013.01); *H04L 67/12* (2013.01); *H04L 2012/40273* (2013.01)

(58) Field of Classification Search
CPC .................... H04L 12/40; H04L 67/12; H04L 2012/40273
See application file for complete search history.

(56) References Cited

U.S. PATENT DOCUMENTS

| 7,148,787 | B2* | 12/2006 | Lucy | ....................... B60R 25/24 340/5.72 |
| 7,940,834 | B2* | 5/2011 | Gildea | .................... G01S 19/24 375/149 |

(Continued)

FOREIGN PATENT DOCUMENTS

| JP | 2005-130010 A | 5/2005 |
| JP | 2015-207912 A | 11/2015 |

(Continued)

OTHER PUBLICATIONS

International Search Report, Application No. PCT/JP2019/008726, dated May 28, 2019. ISA/Japan Patent Office.

*Primary Examiner* — Chandrahas B Patel
(74) *Attorney, Agent, or Firm* — Honigman LLP

(57) ABSTRACT

A communication system includes: a receiving device configured to receive data, and repeatedly set a time range; and a transmitting device configured to repeatedly transmit data to the receiving device at a first time interval, and change a transmission interval at which data is transmitted to the receiving device to a second time interval, which is different (Continued)

from the first time interval, if the number of pieces of data received by the receiving device within the time range is 2 or more.

14 Claims, 9 Drawing Sheets

(56) References Cited

U.S. PATENT DOCUMENTS

2002/0191588 A1* 12/2002 Personick ........... H04L 12/6402
   370/352
2014/0328352 A1   11/2014 Mabuchi et al.

FOREIGN PATENT DOCUMENTS

| JP | 2016-074355 A | 5/2016 |
| WO | 2014-115455 A1 | 7/2014 |

* cited by examiner

FIG. 1
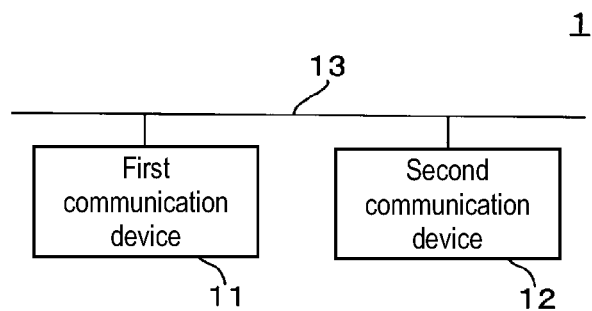
FIG. 2
| Communication device | Data | Identification information | Processing device | Usage |
|---|---|---|---|---|
| First communication device | First data | First identification information | Second communication device | Periodical transmission |
| Second communication device | Second data | Second identification information | Second identification information | Sudden transmission |
FIG. 3
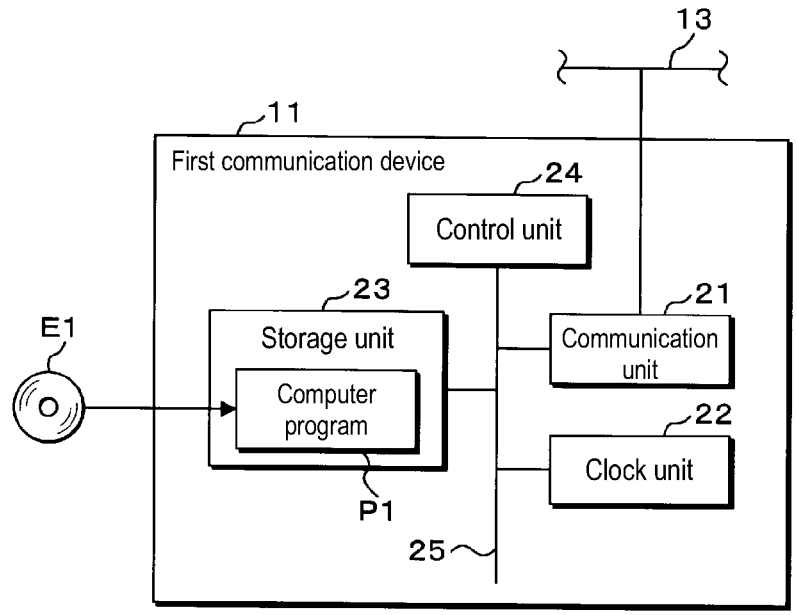

When number of pieces of data is 1

When number of pieces of data is 2 or more

When number of pieces of data is zero

COMMUNICATION SYSTEM, RECEIVING DEVICE, TRANSMISSION INTERVAL CHANGE METHOD, AND COMPUTER PROGRAM

CROSS-REFERENCE TO RELATED APPLICATIONS

This application is the U.S. national stage of PCT/JP2019/008726 filed on Mar. 6, 2019, which claims priority of Japanese Patent Application No. JP 2018-060876 filed on Mar. 27, 2018, the contents of which are incorporated herein.

TECHNICAL FIELD

The present disclosure relates to a communication system, a receiving device, a transmission interval change method, and a computer program.

BACKGROUND

Vehicles are provided with a communication system in which a plurality of communication devices communicate with each other via a communication bus (see Pamphlet of WO 2014/115455). Each communication device may be an Electronic Control Unit (ECU), a relay device for relaying communication, or the like.

The plurality of communication devices included in the communication system described in Pamphlet of WO 2014/115455 include a transmitting device that periodically transmits specification data including specification information, which serves as identification information, via a communication bus, and a receiving device that receives the specification data. In a communication system in which communication is performed via a communication bus, a third party may connect a second transmitting device that has a function of transmitting specification data to the communication bus in an unauthorized manner, and may cause the second transmitting device to transmit unauthorized specification data to a receiving device. Accordingly, the receiving device may perform improper processing based on the unauthorized specification data received from the second transmitting device.

In the communication system described in Pamphlet of WO 2014/115455, in order for the receiving device to be prevented from performing improper processing, the receiving device determines whether or not a plurality of pieces of specification data have been received during a time period from when the previous specification data is received to the time when one cycle of repeated transmission of specification data elapses. If it is determined that a plurality of pieces of specification data have been received, the receiving device regards these pieces of specification data as being highly likely to include unauthorized specification data, and discards all of the received pieces of specification data. This prevents the receiving device from performing improper processing based on unauthorized specification data.

As described above, in the configuration described in Pamphlet of WO 2014/115455, if it is determined that a plurality of pieces of specification data have been received, the receiving device discards all of the received pieces of specification data. Accordingly, authorized specification data transmitted by the transmitting device is also discarded. Therefore, the configuration described in Pamphlet of WO 2014/115455 has the problem that, if unauthorized data is repeatedly transmitted, the receiving device cannot execute processing based on authorized data.

The present disclosure was made in view of the foregoing circumstances, and it is an object thereof to provide a communication system, a receiving device, a transmission interval change method, and a computer program with which it is possible to realize execution of processing based on authorized data even if unauthorized data is repeatedly transmitted.

SUMMARY

A communication system according to an aspect of the present disclosure includes: a receiving device configured to receive data and repeatedly set a time range; and a transmitting device configured to repeatedly transmit data to the receiving device at a first time interval, and change a transmission interval at which data is transmitted to the receiving device to a second time interval, which is different from the first time interval, if the number of pieces of data received by the receiving device within the time range is 2 or more.

A receiving device according to an aspect of the present disclosure includes: a receiving unit configured to receive data; and a data transmitting unit configured to transmit, if the number of pieces of data received by the receiving unit within a repeatedly set time range is 2 or more, change data for giving an instruction to change a transmission interval for data to be transmitted repeatedly.

A transmission interval change method according to an aspect of the present disclosure is such that a computer executes the steps of repeatedly setting a time range; and giving an instruction to transmit, if the number of pieces of data received within the set time range is 2 or more, change data for giving an instruction to change a transmission interval for data to be transmitted repeatedly.

A computer program according to an aspect of the present disclosure causes a computer to execute the steps of repeatedly setting a time range; and giving an instruction to transmit, if the number of pieces of data received within the set time range is 2 or more, change data for giving an instruction to change a transmission interval for data to be transmitted repeatedly.

Note that the present disclosure can be realized not only as a communication system or a receiving device that includes the above-described characteristic processing units but also as a transmission interval change method that includes the above-described characteristic processing as steps or a computer program for causing a computer to execute these steps. Also, the present disclosure can be realized as a semiconductor integrated circuit that realizes a portion or the entirety of the communication system or the receiving device, or another system that includes the communication system or the receiving device.

Advantageous Effects of Present Disclosure

According to the above-described aspects, it is possible to realize the execution of processing based on authorized data even if unauthorized data is repeatedly transmitted.

BRIEF DESCRIPTION OF DRAWINGS

FIG. 1 is a block diagram showing a configuration of a main portion of a communication system according to Embodiment 1.

FIG. 2 is a table for illustrating communication performed by a first communication device and a second communication device.

FIG. 3 is a block diagram showing a configuration of a main portion of the first communication device.

DESCRIPTION OF EMBODIMENTS OF PRESENT DISCLOSURE

Figure 4:
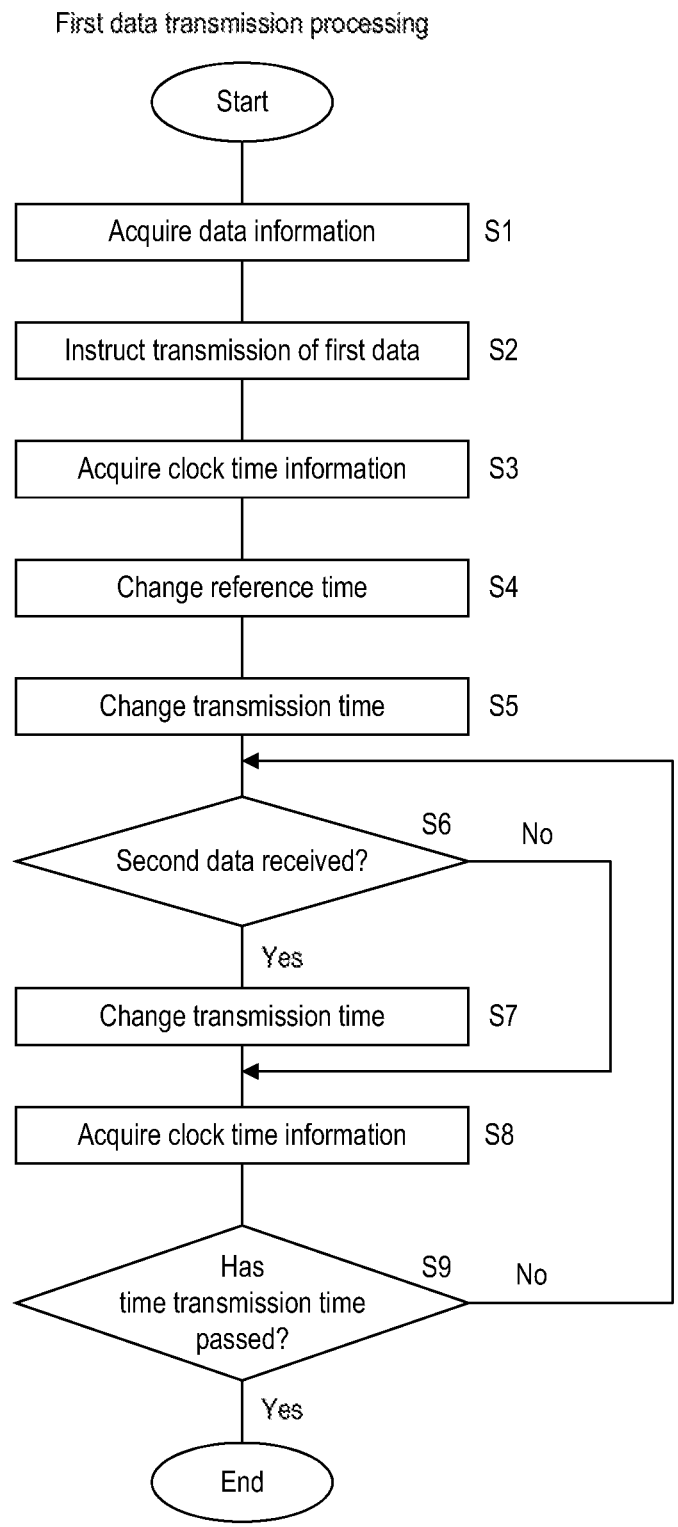
FIG. 4 is a flowchart showing a procedure of first data transmission processing.

First, aspects of implementation of the present disclosure will be listed and described. At least some of the following embodiments may also be combined as desired.

According to an aspect of the present disclosure, a communication system includes: a receiving device configured to receive data and repeatedly set a time range; and a transmitting device configured to repeatedly transmit data to the receiving device at a first time interval, and change a transmission interval at which data is transmitted to the receiving device to a second time interval, which is different from the first time interval, if the number of pieces of data received by the receiving device within the time range is 2 or more.

In the communication system according to the aspect of the present disclosure, the receiving device sets the time range based on the number of pieces of data received within a previous time range set previously.

In the communication system according to the aspect of the present disclosure, if the number of pieces of data received by the receiving device within the time range is 2 or more, execution of processing based on the plurality of pieces of data received by the receiving device is omitted.

In the communication system according to the aspect of the present disclosure, after having transmitted data to the receiving device at the second time interval, the transmitting device returns the transmission interval to the first time interval.

In the communication system according to the aspect of the present disclosure, the receiving device counts the number of times where the number of pieces of data received within the time range is 2 or more, if the number of times counted by the receiving device is equal to or greater than a predetermined number of times, the transmitting device changes the transmission interval to the second time interval, and the predetermined number of times is two or more.

According to an aspect of the present disclosure, a receiving device includes: a receiving unit configured to receive data; and a data transmitting unit configured to transmit, if the number of pieces of data received by the receiving unit within a repeatedly set time range is 2 or more, change data for giving an instruction to change a transmission interval for data to be transmitted repeatedly.

According to an aspect of the present disclosure, a transmission interval change method is such that a computer executes the steps of repeatedly setting a time range; and giving an instruction to transmit, if the number of pieces of data received within the set time range is 2 or more, change data for giving an instruction to change a transmission interval for data to be transmitted repeatedly.

According to an aspect of the present disclosure, a computer program causes a computer to execute the steps of repeatedly setting a time range; and giving an instruction to transmit, if the number of pieces of data received within the set time range is 2 or more, change data for giving an instruction to change a transmission interval for data to be transmitted repeatedly.

In the above-described communication system according to the aspect, if, for example, the number of pieces of data received within a set time range is 1, the receiving device regards the received data as authorized data, and executes processing based on the received data. A case is assumed in which unauthorized data is repeatedly transmitted to the receiving device at the first time interval. In this case, the number of pieces of data received by the receiving device within the time range may be 2 or more.

If the number of pieces of data received by the receiving device within the time range is 2 or more, the transmitting device changes the data transmission interval from the first time interval to the second time interval. The receiving device sets the time range based on the data transmission interval. Accordingly, the data that is received by the receiving device within the time range includes only authorized data, and execution of processing based on the authorized data is realized.

In the above-described communication system according to the aspect, if, for example, the number of pieces of data received within the previous time range is 1, the receiving device sets the time range that corresponds to the first time interval, and if the number of pieces of data received within the previous time range is 2 or more, the receiving device sets the time range that corresponds to the second time interval. Accordingly, an appropriate time range that corresponds to the data transmission interval is set.

In the above-described communication system according to the aspect, if the number of pieces of data received by the receiving device within the time range is 2 or more, it is regarded that unauthorized data is included in the plurality of pieces of data received by the receiving device, and execution of processing based on the plurality of pieces of data is omitted. Accordingly, the receiving device is prevented from executing improper processing based on the unauthorized data.

In the above-described communication system according to the aspect, as described above, if the number of pieces of data received by the receiving device within the time range is 2 or more, the transmitting device changes the transmission interval from the first time interval to the second time interval. A case is assumed in which unauthorized data is repeatedly transmitted to the receiving device at the first time interval. In this case, even if, after the transmitting device has transmitted data at the second time interval, the transmission interval is returned to the first time interval, the timing at which the unauthorized data is received largely differs from the timing at which authorized data is received. Thus, the number of pieces of data received by the receiving device within the time range is likely to be 1.

Furthermore, the system is basically designed on the assumption that the transmitting device transmits data at the first time interval. Accordingly, after the transmitting device has transmitted data at the second time interval, the transmission interval is returned to the first time interval, which is an appropriate time interval.

In the above-described communication system according to the aspect, if the number of times where the number of pieces of data received by the receiving device within the time range is 2 or more is equal to or greater than a predetermined number of times, it is regarded that unauthorized data is highly likely to be transmitted repeatedly at the first time interval, and thus the transmitting device changes the transmission interval to the second time interval.

In the receiving device, the transmission interval change method, and the computer program according to the above-described aspects, if, for example, the number of pieces of data received within a set time range is 1, it is regarded that the received data is authorized data, and processing is executed based on the received data. A case is assumed in which unauthorized data is repeatedly transmitted at a time interval that substantially matches the transmission interval at which data is repeatedly transmitted. In this case, the number of pieces of data received within the time range may be 2 or more.

If the number of pieces of data received within the time range is 2 or more, the data transmission interval is changed from the first time interval to the second time interval. The time range is set based on the data transmission interval. Accordingly, the data that is received within the time range includes only authorized data, and execution of processing based on the authorized data is realized.

The following will describe specific examples of communication systems according to embodiments of the present disclosure with reference to the drawings. Note that the present disclosure is not limited to these examples, but is defined by the claims, and is intended to encompass all modifications within the meanings and scope that are equivalent to the claims.

Embodiment 1

FIG. 1 is a block diagram showing a configuration of a main portion of a communication system 1 in Embodiment 1. The communication system 1 is suitably installed in a vehicle, and includes a first communication device 11, a second communication device 12, and a communication bus 13. The first communication device 11 and the second communication device 12 are connected to the communication bus 13. Furthermore, a not-shown communication device that is different from the first communication device 11 and the second communication device 12 is also connected to the communication bus 13.

Examples of the communication devices connected to the communication bus 13 include an ECU. For example, a sensor and an on-board device are connected to the ECU. In this case, the ECU acquires information that indicates a detected value detected by the sensor connected to this ECU, and transmits data including the acquired information via the communication bus 13. Furthermore, the ECU controls operation of the on-board device connected to this ECU based on the data received via the communication bus 13.

Furthermore, examples of the communication devices connected to the communication bus 13 include a relay device that relays communication between two communication devices. In addition to the communication bus 13, a communication bus that is different from the communication bus 13 is connected to the relay device. The relay device receives data via the communication bus 13, and transmits the received data via the communication bus that is different from the communication bus 13. Furthermore, the relay device receives data via the communication bus that is different from the communication bus 13, and transmits the received data via the communication bus 13. Accordingly, the relay device relays communication between a communication device connected to the communication bus 13 and a communication device connected to the communication bus that is different from the communication bus 13.

The plurality of communication devices connected to the communication bus 13 perform communication in accordance with a Controller Area Network (CAN) protocol or a Controller Area Network with Flexible Data rate (CAN-FD).

Accordingly, each of the plurality of communication devices connected to the communication bus 13 transmits data including identification information. "Identification information" refers to information for identifying the data. Also, data transmitted by one of the communication devices connected to the communication bus 13 is received by all of the remaining communication devices connected to the communication bus 13. Each of the plurality of communication devices connected to the communication bus 13 determines, upon receiving data via the communication bus 13, whether or not the received data is to be discarded based on identification information included in the received data. If it is determined that the data is to be discarded, each of the plurality of communication devices connected to the communication bus 13 discards the received data, and if it is determined that the data is not to be discarded, the communication device executes processing based on the received data.

If a plurality of communication devices start transmitting data at the same time, adjustment will be performed based on pieces of identification information included in the data transmitted by the plurality of communication devices. Accordingly, one of the plurality of communication devices continues to transmit the data. The remaining communication devices stop transmitting the data and wait until the one communication device, which has continued to transmit data, ends data transmission. After the data transmission is ended, the remaining communication devices start transmitting the data again. Accordingly, if a plurality of communication devices start transmitting data at the same time, a timing at which at least one communication device transmits the data will be delayed.

Data that is transmitted via the communication bus 13 includes data that is periodically transmitted, and data that is suddenly transmitted. The data that is periodically transmitted refers to data that includes information indicating the speed of the vehicle, the illuminance outside the vehicle, and the like. The data that is suddenly transmitted refers to data that includes, for example, information that is used to give an instruction to lock or unlock a door of the vehicle.

The following will describe communication that is performed by the first communication device 11 and the second communication device 12.

FIG. 2 is a table for illustrating communication that is performed by the first communication device 11 and the second communication device 12. The first communication device 11 periodically transmits, via the communication bus 13, first data that includes first identification information serving as identification information. The processing device that executes processing based on the first data is the second communication device 12. Upon receiving the first data, the second communication device 12 executes processing based on the received first data.

Also, the second communication device 12 transmits, via the communication bus 13, second data that includes second identification information serving as identification information. The processing device that executes processing based on the second data is the first communication device 11. Upon receiving the second data, the first communication device 11 stores the received second data and executes processing based on this second data.

The first communication device 11 and the second communication device 12 function as a transmitting device and a receiving device, respectively.

FIG. 3 is a block diagram showing a configuration of a main portion of the first communication device 11. The first communication device 11 includes a communication unit 21, a clock unit 22, a storage unit 23, and a control unit 24. These units are connected to an internal bus 25. The communication unit 21 is also connected to the communication bus 13 as well as to the internal bus 25.

The control unit 24 acquires data information that is to be included in data to be transmitted. In accordance with an instruction from the control unit 24, the communication unit 21 transmits the first data that includes, in addition to the first identification information, the data information acquired by the control unit 24, via the communication bus 13. Furthermore, the communication unit 21 receives data transmitted via the communication bus 13. If the identification information included in the received data is the second identification information, the communication unit 21 notifies the control unit 24 of the reception of the second data.

If the communication unit 21 and another communication device connected to the communication bus 13 start transmitting data at the same time, adjustment will be performed. If, as a result of the adjustment, the communication unit 21 stops transmitting the data, the communication unit 21 will transmit the data again after completion of the data transmission via the communication bus 13. Furthermore, if data is being transmitted via the communication bus 13 at a point in time when the control unit 24 instructs the communication unit 21 to transmit the first data, the communication unit 21 will start transmitting the first data after the completion of the data transmission.

The control unit 24 acquires clock time information, which indicates the current time, from the clock unit 22.

The storage unit 23 is a nonvolatile memory. A computer program P1 is stored in the storage unit 23. Furthermore, reference time information, which indicates reference time for transmission of the first data, and transmission time information, which indicates a transmission time when the first communication device 11 is to transmit the first data, are stored in the storage unit 23. The reference time indicated by the reference time information, and the transmission time indicated by the transmission time information are changed by the control unit 24.

The control unit 24 includes one or more Central Processing Units (CPUs). The one or more CPUs included in the control unit 24 execute the computer program P1 and thereby execute first data transmission processing for transmitting the first data. The computer program P1 is used for the one or more CPUs included in the control unit 24 to execute the first data transmission processing.

Note that the computer program P1 may also be stored in a storage medium E1 so as to be readable by the one or more CPUs included in the control unit 24. In this case, the computer program P1 read from the storage medium E1 by a not-shown reading device is stored in the storage unit 23. The storage medium E1 is an optical disc, a flexible disk, a magnetic disk, a magneto-optical disc, a semiconductor memory, or the like. The optical disc is a Compact Disc (CD)-Read Only Memory (ROM), a Digital Versatile Disc (DVD)-ROM, a Blu-ray (registered trademark) Disc (BD), or the like. The magnetic disk is, for example, a hard disk. Furthermore, the computer program P1 may also be downloaded from a not-shown external device connected to a not-shown communication network, and the downloaded computer program P1 may also be stored in the storage unit 23.

FIG. 4 is a flowchart showing a procedure of the first data transmission processing. In the first data transmission processing, the control unit 24 first acquires data information (step S1). If the first communication device 11 is an ECU, the data information is, for example, information that indicates the speed of the vehicle or a detected value for the illuminance outside the vehicle detected by the sensor connected to the ECU, or the like. If the first communication device 11 is a relay device, the data information is information included in the data received via a communication bus that is different from the communication bus 13.

Then, the control unit 24 instructs the communication unit 21 to transmit, in addition to the first identification information, the first data that includes the data information acquired in step S1 (step S2). In response thereto, the communication unit 21 transmits the first data via the communication bus 13. As described above, if the state of data transmission via the communication bus 13 indicates that the first data cannot be transmitted via the communication bus 13, the communication unit 21 waits until the state of data transmission indicates that the first data can be transmitted via the communication bus 13. Accordingly, a time period from when the control unit 24 executes step S2 to the time when the communication unit 21 transmits the first data varies according to the state of data transmission via the communication bus 13.

After the execution of step S2, the control unit 24 acquires clock time information from the clock unit 22 (step S3), and changes the reference time indicated by the reference time information to the time indicated by the acquired clock time information (step S4). Then, the transmission time indicated by the transmission time information is changed from the reference time indicated by the reference time information to a time at which first reference time has elapsed (step S5). The first reference time is preset, and is, for example, 300 ms.

Then, the control unit 24 determines whether or not the communication unit 21 has received the second data (step S6). As described above, the second data is data that includes the second identification information. If it is determined that the communication unit 21 has received the second data (YES in step S6), the control unit 24 changes, as in step S5, the transmission time from the reference time indicated by the reference time information to the time at which second reference time has elapsed (step S7). The second reference time is also preset. The second reference time is shorter than the first reference time, and is, for example, 100 ms.

If it is determined that the communication unit 21 has not received the second data (NO in step S6), or after step S7 has been executed, the control unit 24 acquires clock time information from the clock unit 22 (step S8), and determines whether or not the time indicated by the acquired clock time information has passed the transmission time indicated by the transmission time information (step S9). If it is determined that the time has not passed the transmission time (NO in step S9), the control unit 24 executes step S6, and monitors whether or not the communication unit 21 has received the second data, until the time of the clock unit 22 passes the transmission time.

If it is determined that the time has passed the transmission time (YES in step S9), the control unit 24 ends the first data transmission processing, and executes the first data transmission processing again. In step S2 of this first data transmission processing, the control unit 24 instructs the communication unit 21 to transmit the first data again.

As described above, typically, the communication unit 21 of the first communication device 11 repeatedly transmits the first data to the second communication device 12 at a first time interval, which substantially corresponds to the first reference time. If the communication unit 21 receives the second data from the second communication device 12, the control unit 24 changes the transmission interval at which the communication unit 21 transmits the first data to a second time interval, which substantially corresponds to the second reference time.

After the communication unit 21 has transmitted the first data to the second communication device 12 at the second time interval, the control unit 24 returns the transmission interval for the first data to the first time interval as long as the communication unit 21 does not newly receive the second data from the second communication device 12. The data information of the second data is information that is used to give an instruction to change the transmission interval for the first data.

Note that, as described above, the time period from when the control unit 24 instructs the communication unit 21 to transmit the first data to the time when the communication unit 21 transmits the first data varies according to the state of data transmission via the communication bus 13. The maximum value of the range of variation of the time period from when the control unit 24 instructs the communication unit 21 to transmit the first data to the time when the communication unit 21 transmits the first data is denoted by Ta, and the first reference time and the second reference time are respectively denoted by Tr1 and Tr2. In this case, the first time interval is a time interval that is equal to or greater than (Tr1−Ta) and is equal to or smaller than (Tr1+Ta). Furthermore, the second time interval is a time interval that is equal to or greater than (Tr2−Ta) and is equal to or smaller than (Tr2+Ta).

The first reference time Tr1 and the second reference time Tr2 are sufficiently longer than the maximum value Ta of the variation range. Accordingly, the first time interval and the second time interval substantially match the first reference time Tr1 and the second reference time Tr2, respectively. Since the second reference time Tr2 is different from the first reference time Tr1, the second time interval is different from the first time interval.

Figure 5:
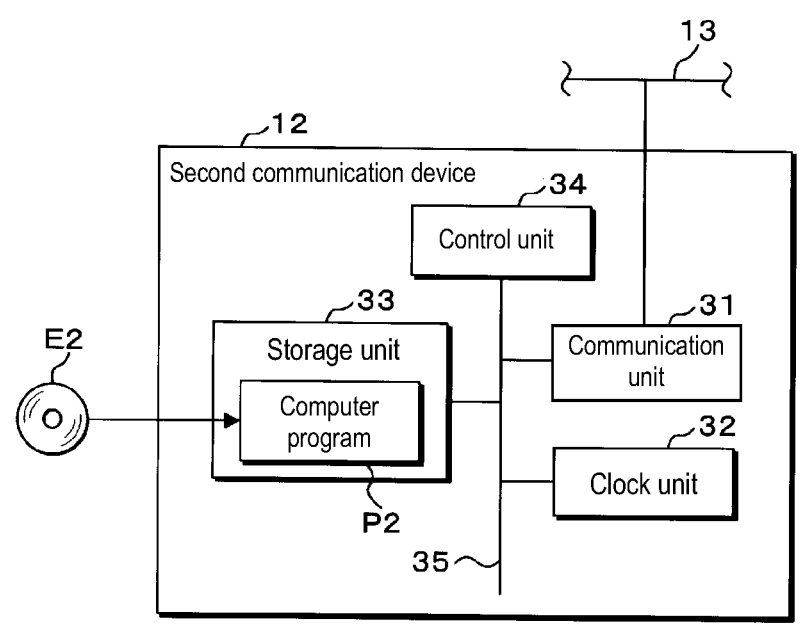
FIG. 5 is a block diagram showing a configuration of a main portion of the second communication device.

FIG. 5 is a block diagram showing a configuration of a main portion of the second communication device 12. The second communication device 12 includes a communication unit 31, a clock unit 32, a storage unit 33, and a control unit 34. These units are connected to an internal bus 35. The communication unit 31 is also connected to the communication bus 13 as well as to the internal bus 35.

The communication unit 31 receives data transmitted via the communication bus 13. Accordingly, the first data transmitted by the communication unit 21 of the first communication device 11 via the communication bus 13 is received by the communication unit 31 of the second communication device 12. If the identification information included in the received data is the first identification information, that is, if the received data is the first data, the communication unit 31 gives the data information included in the received data to the control unit 34. The communication unit 31 functions as a receiving unit.

Furthermore, the communication unit 21 transmits, in accordance with the instruction from the control unit 24, second data that includes, in addition to the second identification information, data information for giving an instruction to change the transmission interval for the first data to the second time interval, via the communication bus 13.

If the communication unit 31 and another communication device connected to the communication bus 13 start transmitting data at the same time, adjustment will be performed. If, as a result of the adjustment, the communication unit 31 stops transmitting the data, the communication unit 31 will transmit the data again after completion of the data transmission via the communication bus 13. Furthermore, if data is being transmitted via the communication bus 13 at a point in time when the control unit 34 instructs the communication unit 31 to transmit the second data, the communication unit 31 starts transmitting the second data after the completion of the data transmission.

The control unit 34 acquires clock time information, which indicates the current time, from the clock unit 32.

The storage unit 33 is a nonvolatile memory. A computer program P2 is stored in the storage unit 33. Furthermore, reception time information, which indicates reception time at which the first data has been received, is stored in the storage unit 33. The reception time indicated by the reception time information is changed by the control unit 34. Also, range information, which indicates a reception time range in which the first data is to be received, is stored in the storage unit 33. The reception time range is expressed by beginning time at which the reception time range begins, and ending time at which the reception time range ends. The range information specifically indicates the beginning time and the ending time of the reception time range. The reception time range indicated by the range information, that is, the beginning time and the ending time are set by the control unit 34 repeatedly.

The control unit 34 includes one or more CPUs. The one or more CPUs included in the control unit 34 execute the computer program P2 and thereby execute first data reception processing and data information processing. The first data reception processing is processing for receiving the first data. The data information processing is processing relating to data information. The computer program P2 is used for the one or more CPUs included in the control unit 34 to execute the first data reception processing and the data information processing. The control unit 34 executes the first data reception processing and the data information processing in parallel to each other, using a time-sharing method.

Note that the computer program P2 may also be stored in a storage medium E2 so as to be readable by the one or more CPUs included in the control unit 34. In this case, the computer program P2 read from the storage medium E2 by a not-shown reading device is stored in the storage unit 33. The storage medium E2 is an optical disc, a flexible disk, a magnetic disk, a magneto-optical disc, a semiconductor memory, or the like. Furthermore, the computer program P2 may also be downloaded from a not-shown external device connected to a not-shown communication network, and the downloaded computer program P2 may also be stored in the storage unit 33.

Figure 6:
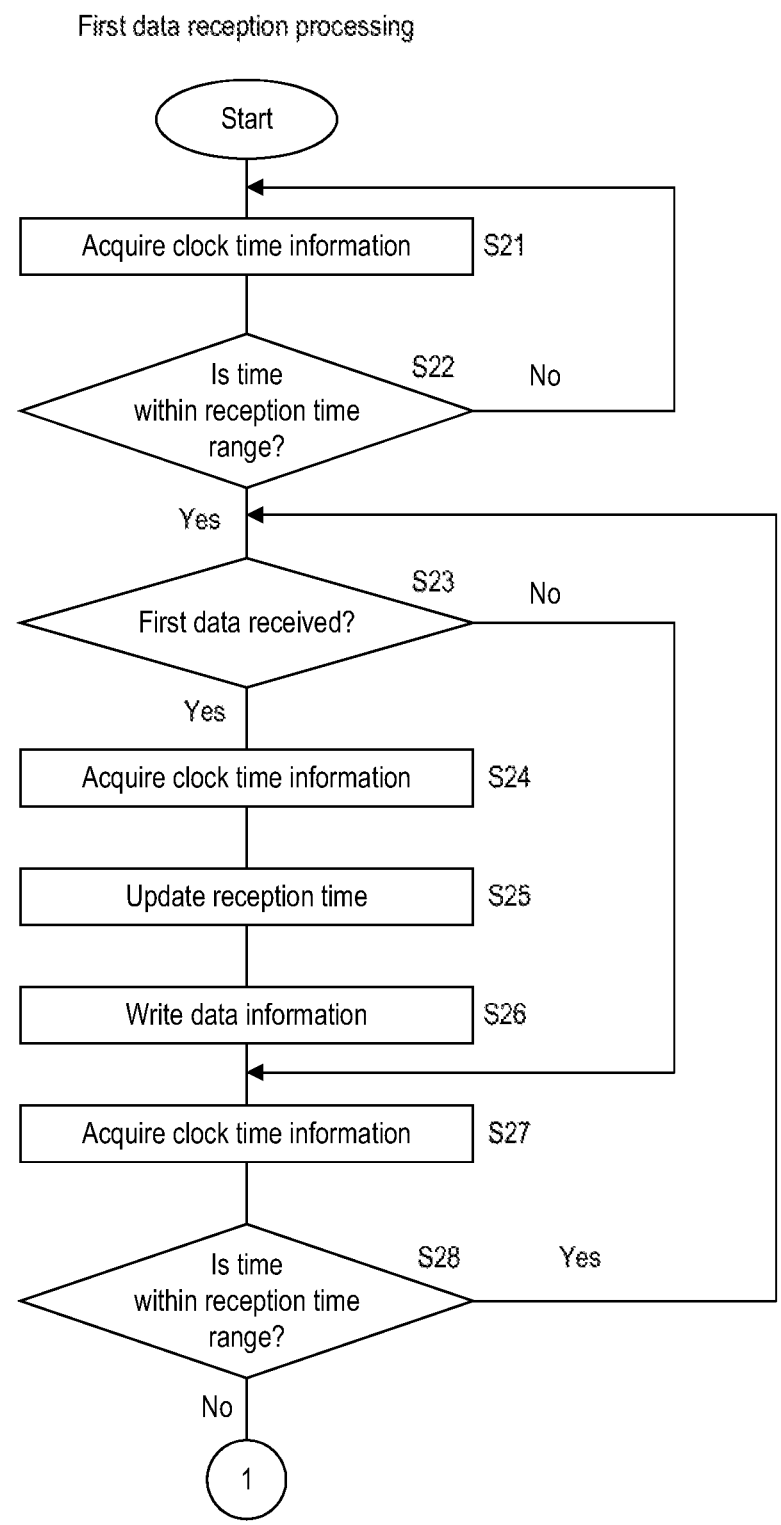
FIG. 6 is a flowchart showing a procedure of first data reception processing.
Figure 7:
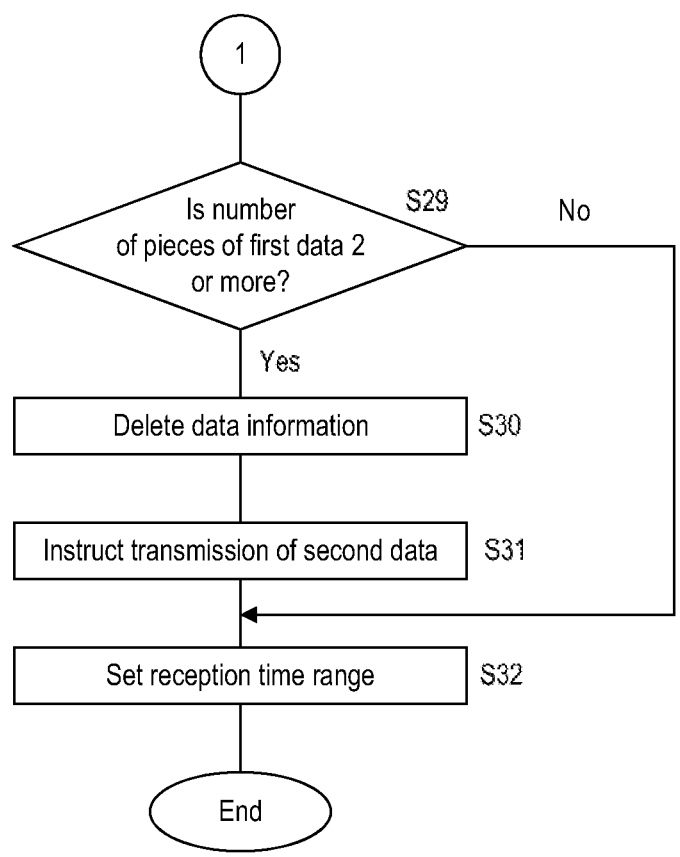
FIG. 7 is a flowchart showing the procedure of the first data reception processing.

FIGS. 6 and 7 show a flowchart of a procedure of the first data reception processing. In the first data reception processing, the control unit 34 first acquires clock time information from the clock unit 32 (step S21), and determines whether or not the acquired time is within the reception time range indicated by the range information (step S22). If it is determined that the time is not within the reception time range (NO in step S22), the control unit 34 executes step S21, and waits until the time of the clock unit 32 is within the reception time range.

If the communication unit 31 receives the first data while the time of the clock unit 32 is not within the reception time range, the communication unit 31 deletes the received first data or leaves it as is, thereby discarding the received first data.

If it is determined that the time is within the reception time range (YES in step S22), the control unit 34 determines whether or not the communication unit 31 has received the first data (step S23). If it is determined that the communication unit 31 has received the first data (YES in step S23), the control unit 34 acquires clock time information from the clock unit 32 (step S24). Then, the control unit 34 updates the reception time indicated by the reception time information to the time indicated by the clock time information acquired in step S24 (step S25), and writes the data information included in the first data received by the communication unit 31 into the storage unit 33 (step S26).

If it is determined that the communication unit 31 has not received the first data (NO in step S23), or after step S26 has been executed, the control unit 34 acquires clock time information from the clock unit 32 (step S27), and determines whether or not the time indicated by the acquired clock time information is within the reception time range indicated by the range information (step S28).

If it is determined that the time is within the reception time range (YES in step S28), the control unit 34 executes step S23, and repeatedly determines whether or not the communication unit 31 has received the first data, until the time of the clock unit 32 is outside the reception time range.

If the number of pieces of first data received by the communication unit 31 while the time of the clock unit 32 is within the reception time range is 1, the control unit 34 writes the data information included in the first data received by the communication unit 31 into the storage unit 33. Furthermore, if the number of pieces of first data received by the communication unit 31 while the time of the clock unit 32 is within the reception time range is 2 or more, the control unit 34 writes all of the pieces of data information included in all of the pieces of first data received by the communication unit 31 into the storage unit 33.

In the communication system 1, there is a likelihood that a third party may connect a communication device to the communication bus 13 in an unauthorized manner, and may cause the communication device (hereinafter, referred to as unauthorized device) connected to the communication bus 13 in an unauthorized manner to transmit unauthorized first data. If the unauthorized device transmits the unauthorized first data while the time of the clock unit 32 is within the reception time range, the number of pieces of first data to be received by the communication unit 31 while the time of the clock unit 32 is within the reception time range may be 2 or more.

If it is determined that the time is not within the reception time range, that is, if the time is outside the reception time range (NO in step S28), the control unit 34 determines whether or not the number of pieces of first data received by the communication unit 31 while the time is within the reception time range is 2 or more (step S29).

If it is determined that the number of pieces of first data is 2 or more (YES in step S29), the control unit 34 regards the plurality of pieces of first data received by the communication unit 31 while the time of the clock unit 32 is within the reception time range, as including unauthorized first data, and deletes all of the pieces of data information that correspond to these pieces of first data (step S30). The control unit 34 executes step S30 and thereby discards these pieces of data information.

After having executed step S30, the control unit 34 instructs the communication unit 31 to transmit second data that includes, in addition to the second identification information, data information for giving an instruction to change the transmission interval for the first data to the second time interval (step S31). In response thereto, the communication unit 31 transmits the second data via the communication bus 13. As described above, if the communication unit 21 of the first communication device 11 receives the second data, the control unit 24 of the first communication device 11 changes the transmission interval for the first data to the second time interval. The second data corresponds to change data. The communication unit 31 also functions as a data transmitting unit.

If it is determined that the number of pieces of first data is less than 2 (NO in step S29), or after step S31 has been executed, the control unit 34 newly sets the reception time range indicated by the range information based on the number of pieces of first data received by the communication unit 31 while the time of the clock unit 32 is within the reception time range (step S32). Specifically, the beginning time and the ending time of the reception time range are newly set.

Figure 8:
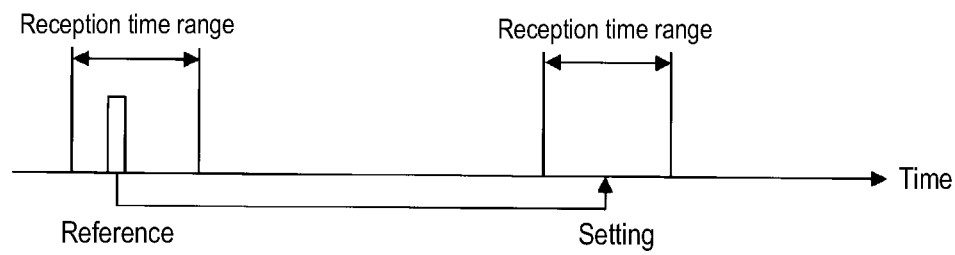
FIG. 8 is a diagram illustrating settings of a reception time range.
Figure 8:
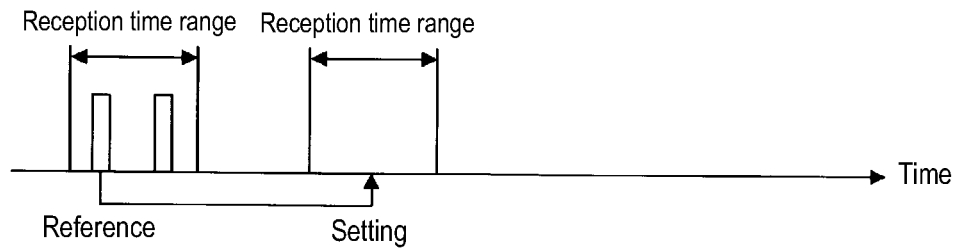
Figure 8:
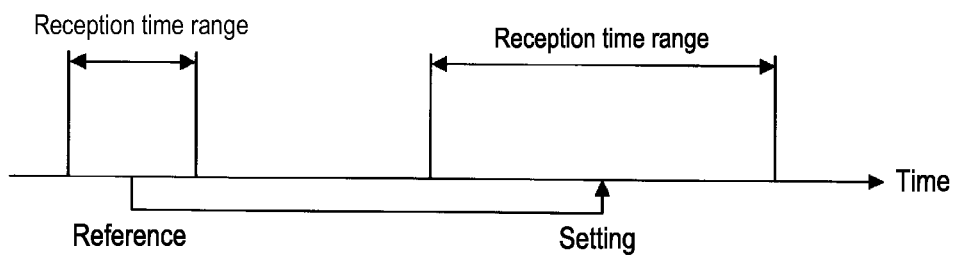

FIG. 8 is a diagram illustrating settings of the reception time range. In FIG. 8, the first data, which includes the first identification information, is indicated by a white rectangle.

If the number of pieces of first data received by the communication unit 31 while the time of the clock unit 32 is within the reception time range is 1, the reception time range is newly set using the reception time indicated by the reception time information as a reference. The reception time is the time at which the communication unit 31 first receives the first data while the time of the clock unit 32 is within the reception time range. The control unit 34 newly sets a reception time range centered on the time at which the first reference time has elapsed from the reception time. As described above, the first reference time substantially corresponds to the first time interval.

A first time width and a second time width for use in setting the reception time range are preset. Hereinafter, the first time width and the second time width are respectively denoted by "Tw1" and "Tw2". As described above, the first reference time and the second reference time are respectively denoted by "Tr1" and "Tr2". In the first communication device 11, the maximum value of the variation range of the time period from when the control unit 24 instructs the communication unit 21 to transmit the first data to the time when the communication unit 21 transmits the first data is denoted by "Ta".

The first time width Tw1 and the second time width Tw2 satisfy the following inequality expression.

$$Ta < Tw1 < Tw2 < Tr2$$

As described above, the second reference time Tr2 is less than the first reference time Tr1.

If the number of pieces of first data received by the communication unit 31 while the time of the clock unit 32 is within the reception time range is 1, the control unit 34 sets the beginning time forward by the first time width Tw1 from the time at which the first reference time Tr1 has elapsed from the reception time. Furthermore, the control unit 34 sets the ending time to the time at which the first time width Tw1 has further elapsed from the time at which the first reference time Tr1 has elapsed from the reception time.

In other words, the elapsed time from the reception time by (Tr1−Tw1) is set as the beginning time, and the elapsed time from the reception time by (Tr1+Tw1) is set as the ending time.

Also, if the number of pieces of first data received by the communication unit 31 while the time of the clock unit 32 is within the reception time range is 2 or more, the reception time range is newly set using the reception time indicated by the reception time information as a reference. The control unit 34 newly sets a reception time range centered on the time at which the second reference time Tr2 has elapsed from the reception time.

Specifically, the control unit 34 sets the beginning time to the time forward by the first time width Tw1 from the time at which the second reference time Tr2 has elapsed from the reception time. Furthermore, the control unit 34 sets the ending time to the time at which the first time width Tw1 has further elapsed from the time at which the second reference time Tr2 has elapsed from the reception time.

In other words, the elapsed time from the reception time by (Tr2−Tw1) is set as the beginning time, and the elapsed time from the reception time by (Tr2+Tw1) is set as the ending time. Since the second reference time Tr2 is less than the first reference time Tr1, the reception time range to be newly set approximates the currently set reception time range.

As described above, if the number of pieces of first data is 2 or more, the transmission interval at which the communication unit 21 of the first communication device 11 performs transmission is changed to the second time interval that substantially corresponds to the second reference time Tr2. In response to this change, the control unit 34 newly sets a reception time range that corresponds to the second time interval.

If the number of pieces of first data received by the communication unit 31 while the time of the clock unit 32 is within the reception time range is zero, a next reception time range is newly set using the middle time of the reception time range as a reference.

Specifically, the control unit 34 sets the beginning time to the time forward by the second time width Tw2 from the time at which the first reference time Tr1 has elapsed from the middle time of the reception time range. Furthermore, the control unit 34 sets the ending time to the time at which the second time width Tw2 has further elapsed from the time at which the first reference time Tr1 has elapsed from the middle time of the reception time range.

In other words, the elapsed time from the middle time of the reception time range by (Tr1−Tw2) is set as the beginning time, and the elapsed time from the middle time of the reception time range by (Tr1+Tw2) is set as the ending time. The second time width Tw2 is larger than the first time width Tw1. Accordingly, the reception time range that is set when the number of pieces of first data is zero is larger than the reception time range that is set when the number of pieces of first data is 1.

If the number of pieces of first data is zero, a large reception time range is newly set so as to increase the likelihood that the communication unit 31 receives the first data while the time of the clock unit 32 is within the reception time range.

After the execution of step S32, the control unit 34 ends the first data reception processing, and executes the first data reception processing again.

As described above, in the second communication device 12, the control unit 34 repeatedly sets the reception time range. Furthermore, the control unit 34 newly sets a reception time range based on the number of pieces of first data received by the communication unit 31 while the time of the clock unit 32 is within a previously set reception time range. The reception time range corresponds to a time range.

For example, when having executed step S32 of the first data reception processing, the control unit 34 executes data information processing. In the data information processing, the control unit 34 determines whether or not data information of the first data is stored in the storage unit 33. If it is determined that the data information of the first data is stored, the control unit 34 executes processing according to the data information.

If the second communication device 12 is an ECU and an on-board device is connected to the second communication device 12, the control unit 34 instructs a not-shown output unit to output a control signal based on the data information. The output unit outputs the control signal to the on-board device. The on-board device operates in accordance with the control signal input from the output unit. In this case, the processing according to the data information is to give an instruction to output a control signal.

If the second communication device 12 is a relay device, the control unit 34 instructs a not-shown communication unit to transmit data that includes data information. This communication unit transmits the data via a communication bus that is different from the communication bus 13. In this case, the processing according to the data information is to give an instruction to transmit data that includes the data information.

After having executed the processing according to the data information, the control unit 34 deletes the data information stored in the storage unit 33, and ends the data information processing.

Furthermore, if it is determined that no data information of the first data is stored, the control unit 34 ends the data information processing.

As described above, in the first data reception processing, if the number of pieces of data received by the communication unit 31 while the time of the clock unit 32 is within the reception time range is 2 or more, the control unit 34 deletes, before executing step S32, the plurality of pieces of first data received by the communication unit 31. Accordingly, if the number of pieces of data received by the communication unit 31 while the time of the clock unit 32 is within the reception time range is 2 or more, the control unit 34 does not execute, in the data information processing, processing based on the plurality of pieces of data received by the communication unit 31, and this execution is omitted.

Figure 9:
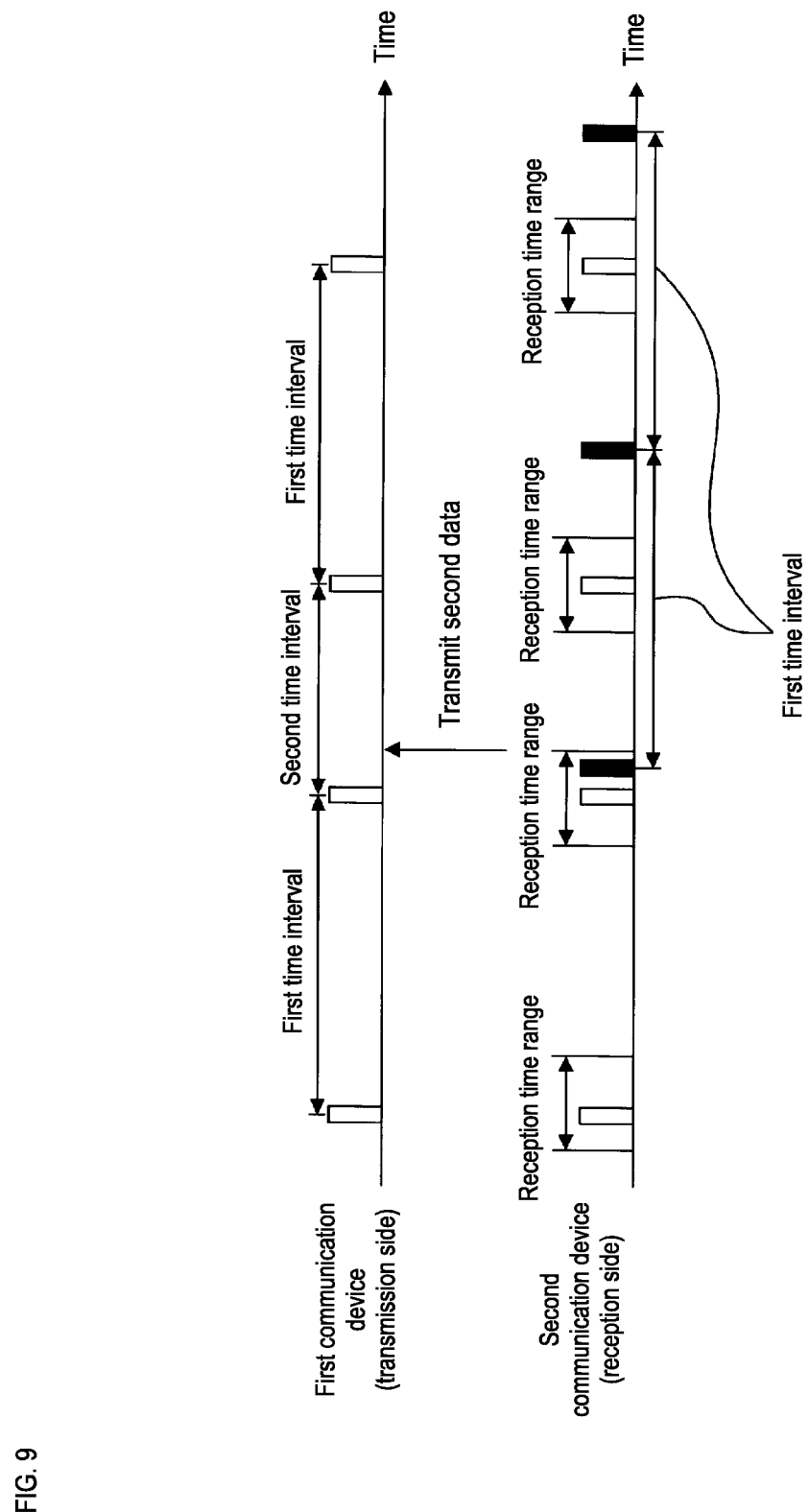
FIG. 9 is a diagram illustrating advantageous effects achieved by the communication system.

FIG. 9 is a diagram illustrating advantageous effects achieved by the communication system 1. FIG. 9 shows transmission of the first data that is performed by the communication unit 21 of the first communication device 11, and reception of the first data that is performed by the communication unit 31 of the second communication device 12. A white rectangle denotes authorized first data that is transmitted by the first communication device 11. A black rectangle denotes unauthorized first data that is transmitted by an unauthorized device via the communication bus 13.

It is assumed that the communication unit 21 of the first communication device 11 transmits the authorized first data at the first time interval. If the number of pieces of first data received by the communication unit 31 of the second communication device 12 while the time of the clock unit 32 is within the reception time range is 1, the control unit 34 of the second communication device 12 regards the first data received by the communication unit 31 as authorized first data, and performs processing based on the first data received by the communication unit 31.

Furthermore, the control unit 34 of the second communication device 12 newly sets a reception time range centered on the time at which the first reference time has elapsed from the reception time, at which the communication unit 31 has received the first data. At this time, since the communication unit 31 of the second communication device 12 does not transmit the second data, the communication unit 21 of the first communication device 11 continues to transmit the first data at the first time interval.

A case is assumed in which an unauthorized device repeatedly transmits unauthorized first data at the first time interval, and the communication unit 31 of the second communication device 12 receives the authorized first data and the unauthorized first data while the time is within the reception time range. In this case, the number of pieces of first data received by the communication unit 31 of the second communication device 12 while the time is within the reception time range is 2 or more, and thus the control unit 34 of the second communication device 12 discards all of the pieces of first data received by the communication unit 31, and execution of the processing based on the plurality of first data received by the communication unit 31 is omitted. Accordingly, the control unit 34 is prevented from executing improper processing based on the unauthorized first data.

Furthermore, the communication unit 31 of the second communication device 12 transmits the second data to the communication unit 21 of the first communication device 11. Accordingly, the communication unit 21 of the first communication device 11 transmits the first data at the second time interval. Furthermore, the control unit 34 of the second communication device 12 newly sets a reception time range centered on the time at which the second reference time has elapsed from the reception time, at which the communication unit 31 has first received the first data.

The second time interval is different from the first time interval. Accordingly, the first data that is received by the communication unit 31 of the second communication device 12 while the time is within the reception time range includes only authorized first data, and the control unit 34 of the second communication device 12 executes processing based on the authorized first data. The execution of the processing based on the authorized first data is realized.

Even if, after the communication unit 21 of the first communication device 11 has transmitted the first data at the second time interval, the transmission interval for the authorized first data is returned to the first time interval, the timing at which the communication unit 31 of the second communication device 12 receives the authorized first data largely differs from the timing at which the communication unit 31 receives the unauthorized first data. Therefore, even if the transmission interval is returned to the first time interval, there is a high likelihood that the number of pieces of first data that are received by the communication unit 31 of the second communication device 12 while the time of the clock unit 32 is within the reception time range is 1. Also, the communication system 1 is basically designed on the assumption that the communication unit 21 of the first communication device 11 transmits data at the first time interval.

With the above-described configurations, in the first communication device 11, after having transmitted first data at the second time interval, the control unit 24 returns the transmission interval to the first time interval, which is an appropriate time interval, as long as the communication unit 21 does not newly received second data.

As described above, if the number of pieces of first data received by the communication unit 31 while the time of the clock unit 32 is within a preset reception time range is 1, the control unit 34 of the second communication device 12 newly sets a reception time range that corresponds to the first time interval. Also, if the number of pieces of first data received by the communication unit 31 while the time of the clock unit 32 is within the preset reception time range is 2 or more, the control unit 34 newly sets a reception time range that corresponds to the second time interval. Accordingly, the control unit 34 can set an appropriate reception time range that corresponds to the transmission interval for authorized first data.

Embodiment 2

In Embodiment 1, the change condition for the control unit 24 of the first communication device 11 to change the transmission interval for the first data to the second time interval is that the number of pieces of first data received by the communication unit 31 of the second communication device 12 while the time of the clock unit 32 is within the reception time range is 2 or more. The change condition may further be limited.

The following will describe Embodiment 2 regarding matters that differ from Embodiment 1. Configurations other than the following configurations are the same as those in Embodiment 1, and therefore constitutional units that are the same as those in Embodiment 1 are denoted using the same reference numerals as those used in Embodiment 1 and descriptions thereof are omitted.

The storage unit 33 according to Embodiment 2 has abnormality frequency information stored therein, which indicates the number of abnormalities where the number of pieces of first data received by the communication unit 31 of the clock unit 32 while the time is within the reception time range is 2 or more. The number of abnormalities indicated by the abnormality frequency information is changed by the control unit 34.

The communication system 1 according to Embodiment 2 differs from the communication system 1 according to Embodiment 1 in content of first data reception processing that is executed by the control unit 34 of the second communication device 12.

Figure 10:
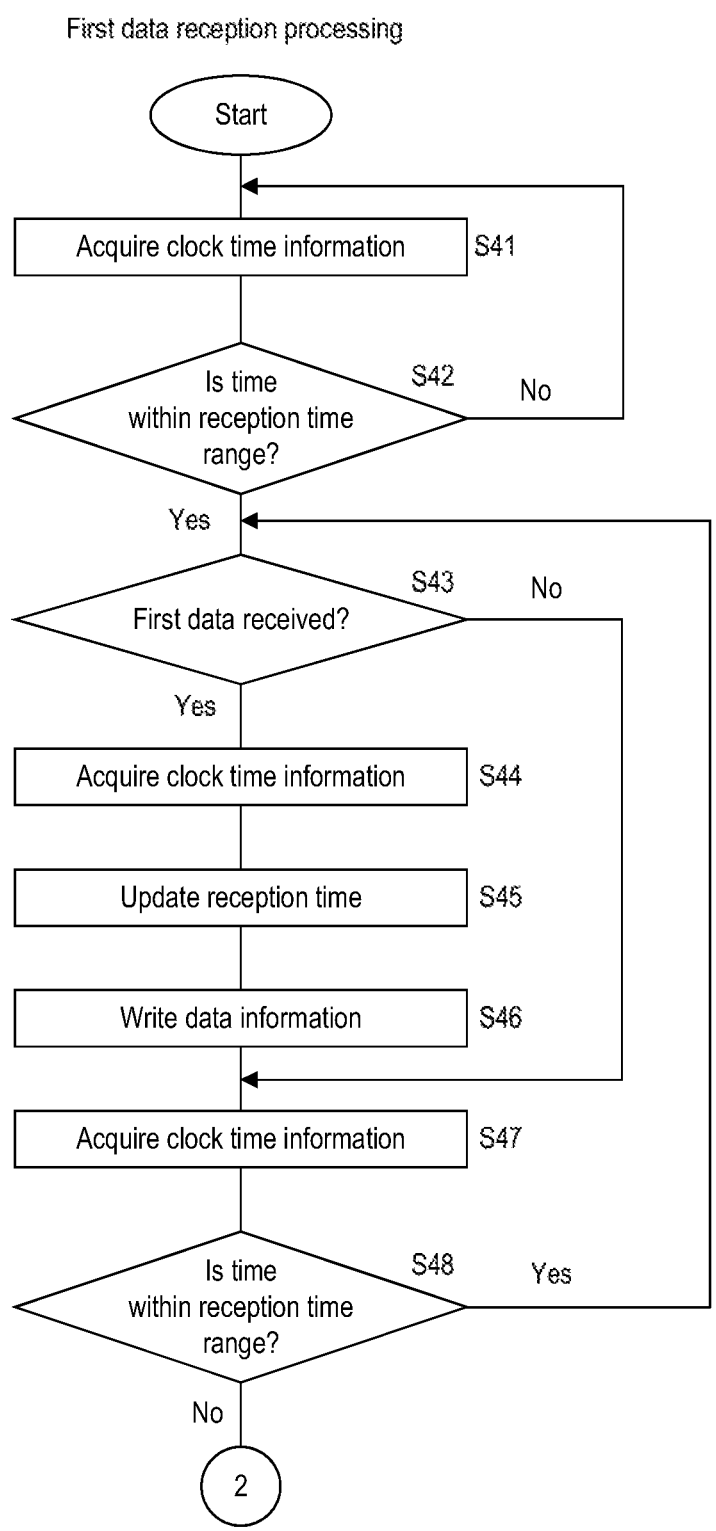
FIG. 10 is a flowchart showing a procedure of first data reception processing according to Embodiment 2.
Figure 11:
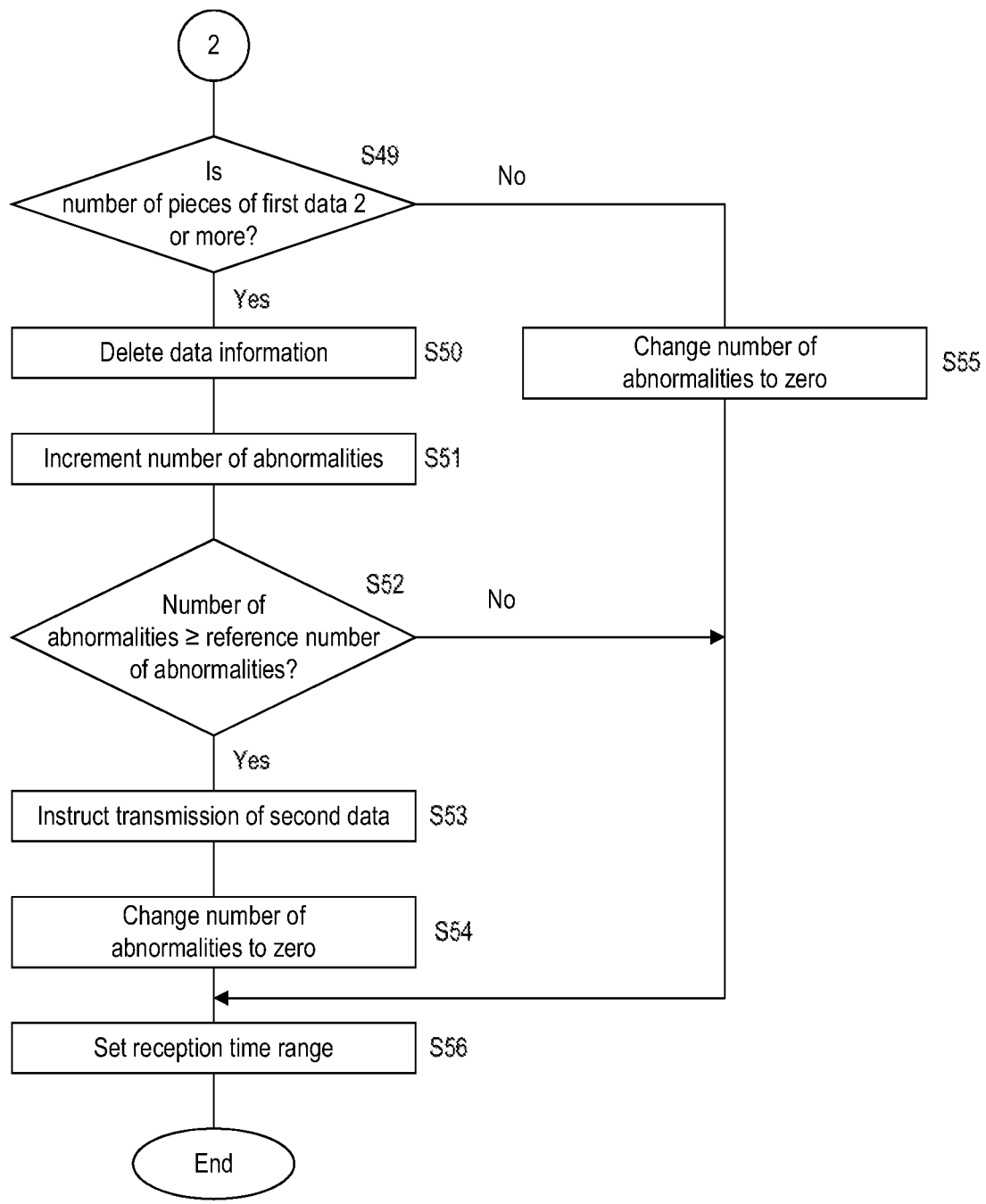
FIG. 11 is a flowchart showing the procedure of the first data reception processing according to Embodiment 2.

FIGS. 10 and 11 show a flowchart of a procedure of the first data reception processing according to Embodiment 2. Steps S41 to S50, and S53 of the first data reception processing in Embodiment 2 are the same as steps S21 to S30, and S31 of the first data reception processing in Embodiment 1. Accordingly, detailed descriptions of steps S41 to S50, and S53 are omitted.

If it is determined that the number of pieces of first data received by the communication unit 31 while the time is within the reception time range is 2 or more (YES in step S49), the control unit 34 executes step S50, and then increments the number of abnormalities indicated by the abnormality frequency information by 1 (step S51). Then, the control unit 34 determines whether or not the number of abnormalities indicated by the abnormality frequency information is equal to or greater than a reference number of abnormalities (step S52). The reference number of abnormalities is an integer of 2 or more, and is preset.

If it is determined that the number of abnormalities is equal to or greater than the reference number of abnormalities (YES in step S52), the control unit 34 executes step S53.

Accordingly, the communication unit 31 transmits the second data via the communication bus 13. As explained with reference to the description of Embodiment 1, if the communication unit 21 of the first communication device 11 receives the second data, the control unit 24 of the first communication device 11 changes the transmission interval for the first data to the second time interval. Then, the control unit 34 changes the number of abnormalities indicated by the abnormality frequency information to zero (step S54).

If it is determined that the number of pieces of first data received by the communication unit 31 while the time is within the reception time range is less than 2 (NO in step S49), the control unit 34 changes the number of abnormalities indicated by the abnormality frequency information to zero (step S55).

If it is determined that the number of abnormalities is less than the reference number of abnormalities (NO in step S52), or after either of steps S54 and S55 has been executed, the control unit 34 sets a reception time range (step S56). In step S56, the control unit 34 sets the reception time range, based on the number of pieces of first data received by the communication unit 31 while the time of the clock unit 32 is within the reception time range, and the number of abnormalities indicated by the abnormality frequency information.

If the number of abnormalities is less than the reference number of abnormalities, and the number of pieces of first data received by the communication unit 31 while the time of the clock unit 32 is within a time range is 1 or more, the control unit 34 performs setting in the same manner as in setting of the reception time range in Embodiment 1 that is performed when the number of pieces of first data is 1 (see FIG. 8). Accordingly, the control unit 34 newly sets a reception time range centered on the time at which the first reference time has elapsed from the reception time, at which the communication unit 31 has first received the first data.

If the number of abnormalities is equal to or greater than the reference number of abnormalities, the control unit 34 performs setting in the same manner as in setting of the reception time range that is performed in Embodiment 1 when the number of pieces of first data is 2 or more (see FIG. 8). Accordingly, the control unit 34 newly sets a reception time range centered on the time at which the second reference time has elapsed from the reception time, at which the communication unit 31 has first received the first data.

If the number of abnormalities is less than the reference number of abnormalities, and the number of pieces of first data received by the communication unit 31 while the time of the clock unit 32 is within the time range is zero, the control unit 34 performs setting in the same manner as in setting of the reception time range that is performed in Embodiment 1 when the number of pieces of first data is zero (see FIG. 8). Accordingly, a large reception time range is newly set centered on the time at which the first reference time has elapsed from the reception time, at which the communication unit 31 has first received the first data.

After the execution of step S56, the control unit 34 ends the first data reception processing, and executes the first data reception processing again.

As described above, the control unit 34 of the second communication device 12 counts the number of abnormalities where the number of pieces of first data received by the communication unit 31 while the time of the clock unit 32 is within the reception time range is 2 or more. If the number of abnormalities is equal to or greater than the reference number of abnormalities, that is, if a situation in which the number of pieces of first data received by the communication unit 31 while the time of the clock unit 32 is within the reception time range is 2 or more occurs sequentially for more than a reference number of abnormalities, the communication unit 31 transmits the second data. Accordingly, the communication unit 21 of the first communication device 11 receives the second data, and the control unit 24 of the first communication device 11 changes the transmission interval for the first data from the first time interval to the second time interval.

In this case, if the number of abnormalities is equal to or greater than the reference number of abnormalities, the control unit 34 of the second communication device 12 regards unauthorized first data as being highly likely to be repeatedly transmitted at the first time interval, and the control unit 24 of the first communication device 11 changes the transmission interval for the first data to the second time interval.

The communication system 1 and the second communication device 12 in Embodiment 2 have the same advantageous effects as those achieved by the communication system 1 and the second communication device 12 in Embodiment 1.

Note that, in the second communication device 12 in Embodiment 2, if the number of pieces of first data received by the communication unit 31 while the time of the clock unit 32 is within the reception time range is less than 2, the control unit 34 does not need to change the number of abnormalities indicated by the abnormality frequency information to zero. Specifically, in the first data reception processing, if it is determined that the number of pieces of first data received by the communication unit 31 while the time is within the reception time range is less than 2 (NO in step S49), the control unit 34 may also execute step S56 without executing step S55.

In this case, even if the situation that the number of pieces of first data received by the communication unit 31 while the time of the clock unit 32 is within the reception time range is 2 or more intermittently occurs, and the number of abnormalities is equal to or greater than the reference number of abnormalities, the communication unit 31 of the second communication device 12 transmits the second data, and the control unit 24 of the first communication device 11 changes the transmission interval for the first data to the second time interval.

Note that, in Embodiments 1 and 2, it is also possible that, after having changed the transmission interval for the first data to the second time interval, the control unit 24 of the first communication device 11 does not return the transmission interval for the first data to the first time interval, but maintains the transmission interval for the first data at the second time interval. In this case, after having changed the transmission interval for the first data to the second time interval, for example, the control unit 34 of the second communication device 12 sets a reception time range centered on the time at which the second reference time has elapsed from the reception time.

Furthermore, the time serving as a reference for setting of a reception time range is not limited to the reception time, that is, in the second communication device 12, the time at which the communication unit 31 has first performed reception while the time of the clock unit 32 is within the reception time range. The time serving as a reference may also be the middle time of a set reception time range. If the number of pieces of first data received by the communication unit 31 while the time of the clock unit 32 is within the reception time range is 2 or more, the time serving as a reference may also be an average time of reception times for the plurality of pieces of first data.

Furthermore, in the first communication device 11, the first data may also be transmitted repeatedly based on, instead of the time, the count time counted by a timer. Furthermore, in the second communication device 12, determination as to whether or not the time of the clock unit 32 is within a reception time range may also be made based on the counted time counted by a timer.

Furthermore, since it is sufficient that the first reference time Tr1 is different from the second reference time Tr2, the first reference time Tr1 may be less than the second reference time Tr2.

Furthermore, the communication protocol that is used for communication via the communication bus 13 is not limited to a CAN protocol or a CAN-FD protocol, and may also be, for example, a communication protocol that is compatible with the Ethernet (Registered Trademark).

Disclosed Embodiments 1 and 2 are illustrative examples in all aspects and should not be considered as restrictive. The scope of the present disclosure is defined not by the above descriptions but by the claims, and is intended to encompass all modifications within the meanings and scope that are equivalent to the claims.

The invention claimed is:

1. A communication system comprising:
   a receiving device configured to receive data and repeatedly set a time range; and
   a transmitting device configured to repeatedly transmit data to the receiving device at a first time interval, and change a transmission interval at which data is transmitted to the receiving device to a second time interval, which is different from the first time interval, if the number of pieces of data received by the receiving device within the time range is 2 or more.

2. The communication system according to claim 1, wherein the receiving device sets the time range based on the number of pieces of data received within a previous time range set previously.

3. The communication system according to claim 2, wherein, if the number of pieces of data received by the receiving device within the time range is 2 or more, execution of processing based on the plurality of pieces of data received by the receiving device is omitted.

4. The communication system according claim 2, wherein, after having transmitted data to the receiving device at the second time interval, the transmitting device returns the transmission interval to the first time interval.

5. The communication system according to claim 2,
   wherein the receiving device counts the number of times where the number of pieces of data received within the time range is 2 or more,
   if the number of times counted by the receiving device is equal to or greater than a predetermined number of times, the transmitting device changes the transmission interval to the second time interval, and
   the predetermined number of times is two or more.

6. The communication system according claim 1, wherein, after having transmitted data to the receiving device at the second time interval, the transmitting device returns the transmission interval to the first time interval.

7. The communication system according to claim 6,
   wherein the receiving device counts the number of times where the number of pieces of data received within the time range is 2 or more,
   if the number of times counted by the receiving device is equal to or greater than a predetermined number of times, the transmitting device changes the transmission interval to the second time interval, and
   the predetermined number of times is two or more.

8. The communication system according to claim 1,
   wherein the receiving device counts the number of times where the number of pieces of data received within the time range is 2 or more,
   if the number of times counted by the receiving device is equal to or greater than a predetermined number of times, the transmitting device changes the transmission interval to the second time interval, and
   the predetermined number of times is two or more.

9. The communication system according to claim 1, wherein, if the number of pieces of data received by the receiving device within the time range is 2 or more, execution of processing based on the plurality of pieces of data received by the receiving device is omitted.

10. The communication system according to claim 9,
    wherein the receiving device counts the number of times where the number of pieces of data received within the time range is 2 or more,
    if the number of times counted by the receiving device is equal to or greater than a predetermined number of times, the transmitting device changes the transmission interval to the second time interval, and
    the predetermined number of times is two or more.

11. The communication system according claim 9, wherein, after having transmitted data to the receiving device at the second time interval, the transmitting device returns the transmission interval to the first time interval.

12. A receiving device comprising:
    a receiving unit configured to receive data; and
    a data transmitting unit configured to transmit, if the number of pieces of data received by the receiving unit within a repeatedly set time range is 2 or more, change data for giving an instruction to change a transmission interval for data to be transmitted repeatedly.

13. A transmission interval change method in which a computer executes the steps of:
    repeatedly setting a time range; and
    giving an instruction to transmit, if the number of pieces of data received within the set time range is 2 or more, change data for giving an instruction to change a transmission interval for data to be transmitted repeatedly.

14. A computer program product comprising a non-transitory, machine readable medium soring instructions which, when executed by at least one programmable processor causes at least one programmable processor to execute the steps of:
    repeatedly setting a time range; and
    giving an instruction to transmit, if the number of pieces of data received within the set time range is 2 or more, change data for giving an instruction to change a transmission interval for data to be transmitted repeatedly.

* * * * *